United States Patent [19]

Heyl

[11] Patent Number: 5,631,966
[45] Date of Patent: May 20, 1997

[54] AUDIO SIGNAL CONVERSION USING FREQUENCY BAND DIVISION

[75] Inventor: Lawrence F. Heyl, Mountain View, Calif.

[73] Assignee: Apple Computer, Inc., Cupertino, Calif.

[21] Appl. No.: 194,237

[22] Filed: Feb. 10, 1994

[51] Int. Cl.⁶ ........................................... G10L 3/02
[52] U.S. Cl. ................................ 381/77; 375/260
[58] Field of Search ........................ 381/2, 61, 63, 381/77, 84, 29, 34, 106; 375/260

[56] References Cited

U.S. PATENT DOCUMENTS 4,455,649  6/1984  Esteban et al. ........................ 381/31
4,637,402  1/1987  Adelman ................................ 381/68.2

*Primary Examiner*—Leo Boudreau
*Assistant Examiner*—Jerome Grant, II
*Attorney, Agent, or Firm*—David J. Larwood

[57] ABSTRACT

The present invention includes a system and method for audio signal conversion using frequency band division. By making use of the statistical properties of an audio signal, the system and method achieves significant coding efficiency, on the order of twice that achieved by linear PCM. Quantization is performed on multiple frequency bands of audio data which have different power density characteristics and sample rate requirements.

25 Claims, 3 Drawing Sheets

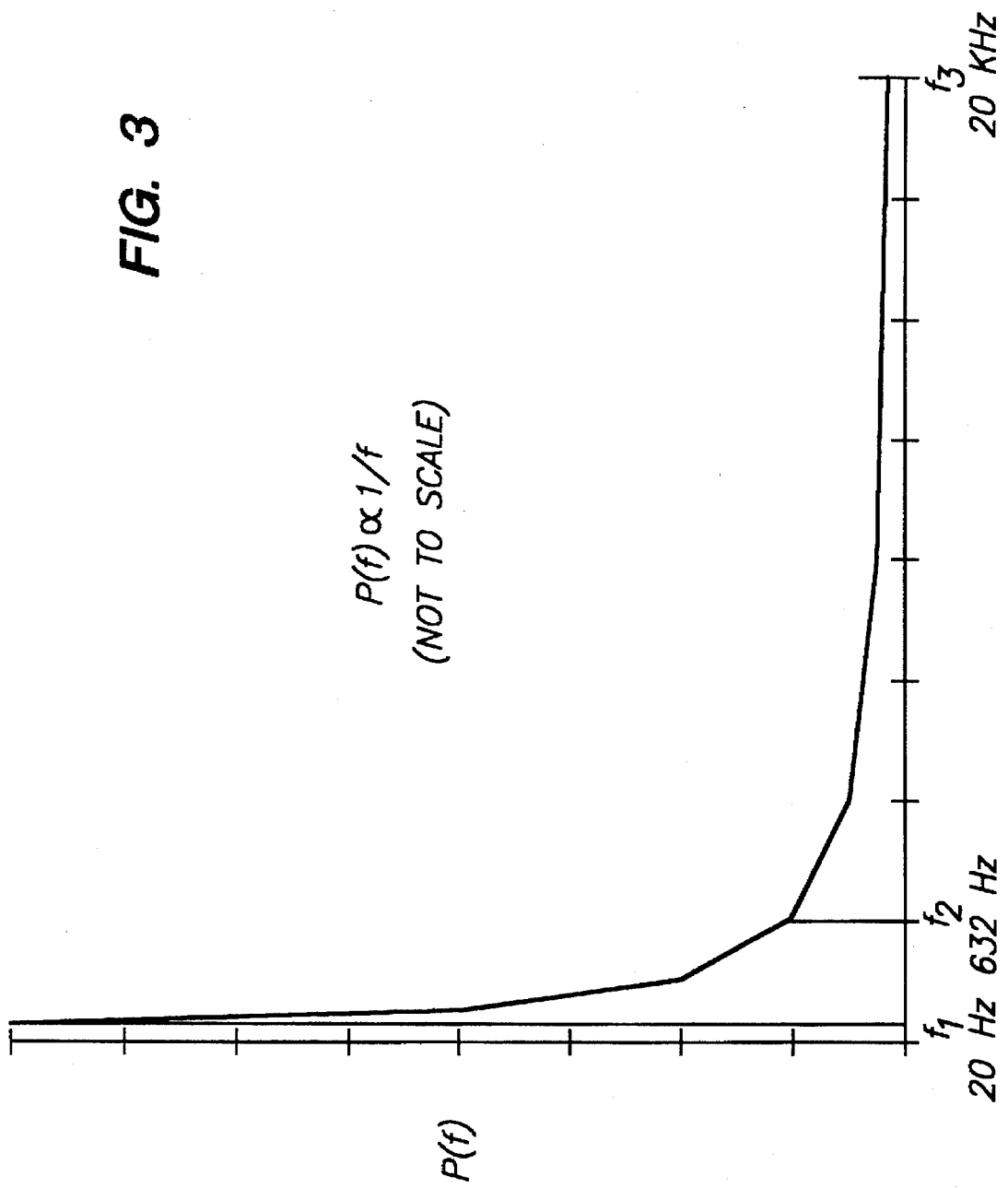

AUDIO SIGNAL CONVERSION USING FREQUENCY BAND DIVISION

BACKGROUND OF THE INVENTION

The present invention relates generally to audio signal processing, and more particularly to the efficient digital coding and processing of audio signals for use in multimedia and telecommunications applications.

In many multimedia computer applications, both video and audio information are presented simultaneously to the computer user. This simultaneous combination of video and audio information requires a computer to rapidly transfer large quantities of data. That is, the computer must be able to handle high bandwidth data streams. While recent increases in computing power have allowed significant improvements in the multimedia field, the perceived quality of a multimedia presentation can still be limited by the bandwidth capabilities of the host computer system.

Currently, the most commonly used technique for digitally encoding broadband audio information is Pulse Code Modulation, or PCM. In PCM, an analog signal is sampled and converted to a fixed-length binary code. The value of the binary code varies according to the instantaneous sampled amplitude of the analog signal.

The Nyquist sampling theorem establishes the minimum sampling rate ($f_s$) that can be used with a given analog input signal. For a signal to be reproduced accurately, each cycle of the highest frequency component contained in the analog input signal ($f_a$) must be sampled at least twice. Consequently, the minimum sampling rate is equal to twice the highest audio input frequency. If $f_s$ is less than 2 times $f_a$, distortion (known as aliasing or foldover) will result.

Since high fidelity audio signals typically include frequencies up to about 20 kHz, commonly used compact disk (CD) quality audio signal processing systems utilize a sampling rate of approximately 44.1 kHz.

As is known to those skilled in the art, one possible implementation of PCM incorporates signed magnitude, n-bit codes, where n may be any positive whole number greater than 1. The most significant bit (MSB) is the sign bit, and the remaining bits are used to represent magnitude.

The number of PCM bits per sample required to accurately reproduce an audio signal is determined primarily by the distribution of amplitudes present in that audio signal. The greater the distribution of amplitudes, the greater the dynamic range (DR) required of the audio signal processing system. A system's dynamic range (in absolute value) is defined as the ratio of the largest possible signal amplitude that can be encoded by the analog to digital (A/D) converter, to the smallest possible signal amplitude that can be encoded by that A/D converter. In units of decibels (dB), dynamic range equals 20 log(absolute value of DR).

The following mathematical relationship can be used to determine the minimum number of bits required to encode an audio signal of a given dynamic range:

$$2^n - 1 = DR$$

where n equals the number of PCM bits, and DR equals the absolute value of the dynamic range of the audio signal being sampled. By performing the appropriate algebraic manipulations, it can be shown that:

$$n = (\log (DR+1))/\log 2$$

The distribution of signal amplitude (and thus power) for an audio signal is often found to be inversely proportional to frequency (i.e., proportional to $1/f_a$). Consequently, the lower frequency components of an audio signal require a system with a higher dynamic range (more bits per sample) for accurate reproduction, while the higher frequency components of an audio signal can be accurately reproduced with a system having a lower dynamic range (fewer bits per sample).

To accurately reproduce all of the frequency components of an audio signal, typical CD quality audio equipment processes each of two stereo channels using 16 bits per sample, allowing a dynamic range of approximately 96 dB. Since signalling rate (in bits per second) equals the number of bits per sample times the sample rate, the signalling rate required for two 16-bit channels sampled at 44.1 kHz is $(2) \times (16) \times (44,100) = 1.4112$ megabits/second.

Despite the relatively high signalling rate requirements for broadband audio reproduction, current integrated circuit technology is capable of realizing relatively cost effective linear PCM systems. However, such PCM systems are not practical where high quality, low signalling rate audio signal processing is required. PCM is fundamentally inefficient in the encoding of broadband audio signals because the sample rate is determined by the highest frequency to be reproduced, and the number of bits per sample is determined by the lowest range of frequencies to be reproduced. Thus, the signalling rate required by a PCM system to encode broadband audio data is significantly higher than that which would be required if the high and low frequency components were encoded separately.

Accordingly, an object of the present invention is to provide an efficient audio encoding system which separates an analog audio signal into separate bands of frequency components before PCM or other encoding.

It is another object of the present invention to provide relatively high quality, low signalling rate audio signal processing.

Additional objects and advantages of the invention will be set forth in part in the description which follows, and in part become apparent to those skilled in the art upon examination of the following, or may be learned by practice of the invention. The objects and advantages of the invention may be realized and obtained by means of the instrumentalities and combinations particularly pointed out in the claims.

SUMMARY OF THE INVENTION

The present invention includes a system and method for audio signal conversion using frequency band division. Such a system includes, in a preferred embodiment, an analog band splitter, first and second gain controlled amplifiers, first and second analog to digital converters, and a digital multiplexer.

The method of the present invention includes the steps of splitting an analog audio input signal into a first frequency band signal and a second frequency band signal, amplifying the first and second frequency band signals by two separate continuously variable signals which are inversely proportional to the instantaneous amplitudes of the first and second frequency band signals, digitizing all of the signals, then multiplexing the signals to generate a digital time division multiplexed signal capable of being reconstructed as the analog audio input signal.

By making use of the statistical properties of an audio signal, the system and method achieves significantly higher coding efficiency than can be achieved by linear PCM of a broadband audio signal. The present invention performs quantization on multiple frequency bands of audio data which have different power density characteristics and sample rate requirements.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

FIG. 3 is a graph showing the approximate power density distribution of a broadband audio signal.

DESCRIPTION OF THE PREFERRED EMBODIMENT

Figure 1:
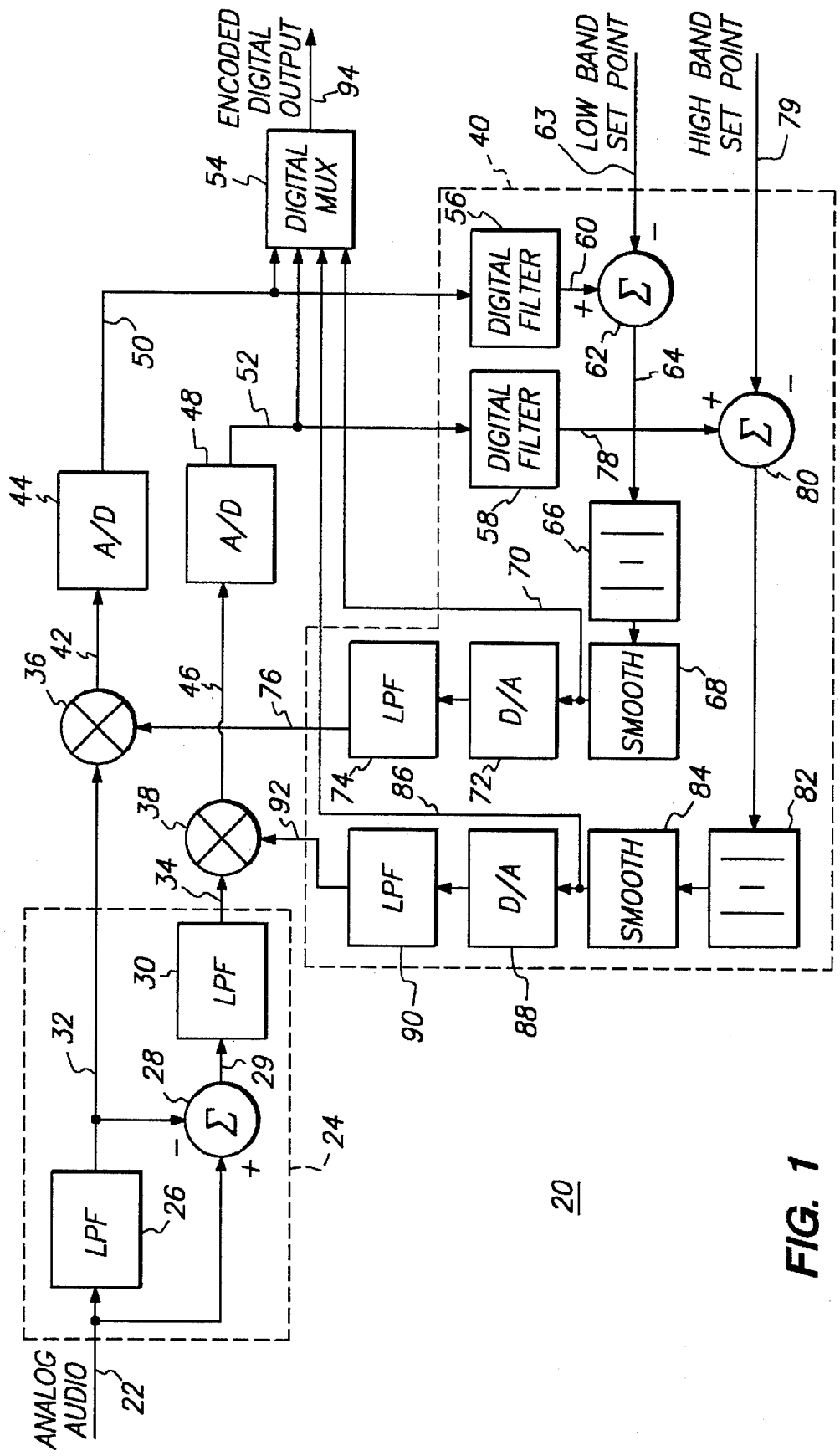
FIG. 1 is a block diagram of an audio signal conversion system according to a preferred embodiment of the invention.

The present invention, which is an audio signal conversion system (ASCS), will be described in terms of the preferred embodiment. Such a system is shown in FIG. 1, where the ASCS is referred to by general reference numeral 20.

Referring now to the drawings wherein like components are designated by like reference units, FIG. 3 is a representational graph showing the approximate power density distribution of a broadband audio signal. As was described above, such broadband signals tend to have power density distributions, P(f), that are inversely proportional to frequency.

In a preferred embodiment, the broadband analog audio signal is split into two bands before analog to digital conversion takes place. These bands are chosen such that their power density, taken as the area under P(f) between the lowest frequency component ($f_1$) and the highest frequency component ($f_3$) is made equal. These areas can be calculated mathematically as follows:

$$\int_{f_1}^{f_2} \frac{df}{f} = \int_{f_2}^{f_3} \frac{df}{f}$$

Evaluation of the integrals shows that:

$$\ln f_2 - \ln f_1 = \ln f_3 - \ln f_2$$

To solve for $f_2$, Let $f_1$=20 Hz and $f_3$=20 kHz; then $$\ln f_2 = \frac{12.899}{2} \text{; and}$$

$$f_2 \approx 632 \text{ Hz.}$$

Thus, for high fidelity broadband audio signals with a frequency range from 20 Hz to 20 kHz, approximately one half of the signal energy is contained in the band from 20 Hz to 632 Hz (the low band), and approximately one half of the signal energy is contained in the band from 632 Hz to 20 kHz (the high band).

Referring now to FIG. 1, a schematic diagram of ASCS 20 is shown. In ASCS 20, a broadband analog audio signal 22 is used as an input to an analog band splitter (indicated by dashed line 24) which separates broadband signal 22 into low band signal 32, and high band signal 34. As was described above, low band signal 32 includes frequency components up to approximately 632 Hz, and high band signal 34 includes frequency components over approximately 632 Hz.

It will be apparent to those skilled in the art that there are several ways to implement band splitter 24. In a preferred embodiment, band splitter 24 includes a first low pass filter 26, an analog summer 28, and a second low pass filter 30. Broadband signal 22 is filtered by low pass filter 26, which generates as an output low band signal 32. While low pass filter 26 need not be a high precision filter, it must provide adequate attenuation to prevent aliasing, and should have passband ripple in accord with standard audio practice (i.e., $\leq 1$ dB).

High band signal 34 is generated by analog summer 28 and low pass filter 30. Summer 28 subtracts low band signal 32 from the broadband signal 22, generating a high pass signal 29. Signal 29 is then used as an input by low pass filter 30, which is used to suppress unwanted high frequency (i.e., greater than 20 kHz) components which may cause aliasing. A filtered high band signal 34 is generated at the output of low pass filter 30.

Next, low band signal 32 is applied as an input to analog gain controlled amplifier (GCA) 36, and high band signal 34 is applied as an input to analog gain controlled amplifier 38. GCAs 36 and 38 can be implemented as transconductance amplifiers, FET attenuators, or the like. A transconductance cell with a linear control transfer characteristic is preferred.

GCA 36 generates a scaled low band signal 42, and GCA 38 generates a scaled high band signal 46. Signals 42 and 46 are then digitized by A/D converters 44 and 48, respectively. Optional anti-aliasing low pass filters (not shown) may be used to filter signals 42 and 46.

GCAs 36 and 38 are controlled by an automatic gain control (AGC) circuit (enclosed by dotted line 40). AGC circuits have been described by Dennis R. Morgan in papers entitled: "On Discrete-Time AGC Amplifiers", IEEE Transactions on Circuits and Systems, CAS-22(2), Feb. 1975, pp. 135–146; and "A/D Conversion Using Geometric Feedback AGC", IEEE Transactions on Computers, C-24, Nov. 1975, pp. 1074–1078.

As is described by Morgan and known to those skilled in the art, the combination of GCAs 36 and 38 with the AGC circuit 40 allows control over the long-term dynamic range of low band signal 32 and high band signal 34. This is performed by continuously and independently scaling, or controlling, the signal in each band to maximize the quantized signal to quantization noise ratio. That is, the amplitudes of low band signal 32 and high band signal 34 are continuously scaled so that when signals 42 and 46 are digitized by A/D converters 44 and 48, a relatively large quantized signal (e.g., PCM code) is generated.

As was described above, scaled low band signal 42 includes frequency components up to about 632 Hz. According to the Nyquist sampling theorem, accurate reproduction of scaled low band signal 42 can be achieved with a sampling rate of approximately 1.3 kHz or greater. In a preferred embodiment, the sampling rate of A/D converter 44 is chosen to be about 2 kHz.

For high quality audio reproduction, A/D converter 44 preferably generates a digitized low band signal 50 having a 16-bit PCM code output per sample, because of the relatively high dynamic range of low band signal 42. However, because of the dynamic range compression provided by the combination of GCA 36 and AGC circuit 40, A/D converter 44 may generate PCM codes having 8–16 bits. Small reductions in reproduced signal quality will result when fewer than 16 bits are used per sample.

As was also described above, scaled high band signal 46 includes frequency components up to about 20 kHz. Therefore, according to the Nyquist sampling theorem, scaled high band signal 46 must be sampled at a rate above 40 kHz. In a preferred embodiment, the sampling rate of A/D converter 48 is about 44.1 kHz, in accordance with industry practice.

Since a large dynamic range is not required to accurately reproduce high band signal 46, and because of the dynamic range compression provided by the combination of GCA 36 and AGC circuit 40, A/D converter 48 preferably generates a digitized high band signal 52 having an 8-bit PCM output per sample.

Digitized low band signal 50 and digitized high band signal 52 are used as inputs by digital multiplexer 54, and by AGC circuit 40.

In AGC circuit 40, digital filter 56 processes the digitized low band signal 50, and digital filter 58 processes the digitized high band signal 52. Filters 56 and 58 are chosen to generate a mirrored filter response with fairly sharp separation between the high band and the low band. This use of mirrored filters is well known to those skilled in the art, and is described in a paper by P. P. Vaidyanathan, entitled: "Quadrature Mirror Filter Banks, M-Band Extensions and Perfect-Reconstruction Techniques", IEEE ASSP Magazine, July, 1987, pp. 4–20. The greater signal separation provided by filters 56 and 58 reduces the possibility of crosstalk between the high band and low band channels.

Digital filter 56 generates a low band output 60 which is used as an input by a summer 62. Summer 62 is used to subtract low band set point 63 from output 60. The low band set point 63 is usually chosen to be about 6 dB below the full scale output of A/D converter 44.

Next, the output signal 64 of summer 62 is used as an input by measurement circuit 66, which generates as its output the absolute value of signal 64. The output of circuit 66 is then smoothed by an accumulator 68.

Accumulator 68 generates as its output digital low band gain control signal 70. Digital low band gain control signal 70 is converted to an analog signal by D/A converter 72, and then low pass filtered (to attenuate gain control images) by low pass filter 74. An analog filtered low band gain control signal 76 is generated by filter 74, and is used to control the gain of GCA 36 as described above.

Digital filter 58 generates a high band output signal 78 that is processed almost identically to that described above with respect to low band output signal 60. The high band signal processing path includes a summer 80, a measurement circuit 82, an accumulator 84, a D/A converter 88, and a low pass filter 90. Summer 80 subtracts high band set point 79 from high band output signal 78. High band set point 79 is usually chosen to be about 6 dB below the full scale output of A/D converter 48.

Accumulator 84 generates as its output digital high band gain control signal 86. An analog filtered high band gain control signal 92 is generated at the output of filter 90, and is used to control the gain of GCA 38 as described above.

Digital multiplexer 54 receives as its input digital low band signal 50, digital high band signal 52, digital low band gain control signal 70, and digital high band gain control signal 86. Multiplexer 54 switches asymmetrically between these four inputs to generate an encoded digital output serial data stream 94.

Most of the time, multiplexer 54 selects digitized high band signal 52 (which is preferably sampled at 44.1 kHz) to form part of time division multiplexed encoded digital output data stream 94. When high band signal 52 is not selected, multiplexer 54 switches between digitized low band signal 50, which is preferably sampled at approximately 2 kHz, and the digitized low and high band gain control signals 70 and 86, which are preferably sampled at approximately 100 Hz to 1 kHz each. The data contained in output stream 94 allows a digital to analog reconstruction such that the separately digitized high and low band components, when weighted with their respective gain control values, yield a signal that sums to the value of analog input signal 22.

If A/D converter 44 generates 16 bit samples, and signal 76 and 92 are each 8 bits wide, output stream 94 has a signalling rate of (2 kHz×16 bits/sample)+(44.1 kHZ×8 bits/sample)+(2×1 kHz×8 bits/sample) =400.8 kilobits/second per channel, or 801.6 kilobits/second for two stereo channels. This is only about 57% of the signalling rate required by a full 16 bit, 44.1 kHz sample rate system. If A/D converter 44 generates only 8 bits per sample, the output signal 94 would have a signalling rate of 769.6 kilobits/second for two audio channels, which is about 55% of the signalling rate required by a 16 bit, 44.1 kHz system.

Figure 2:
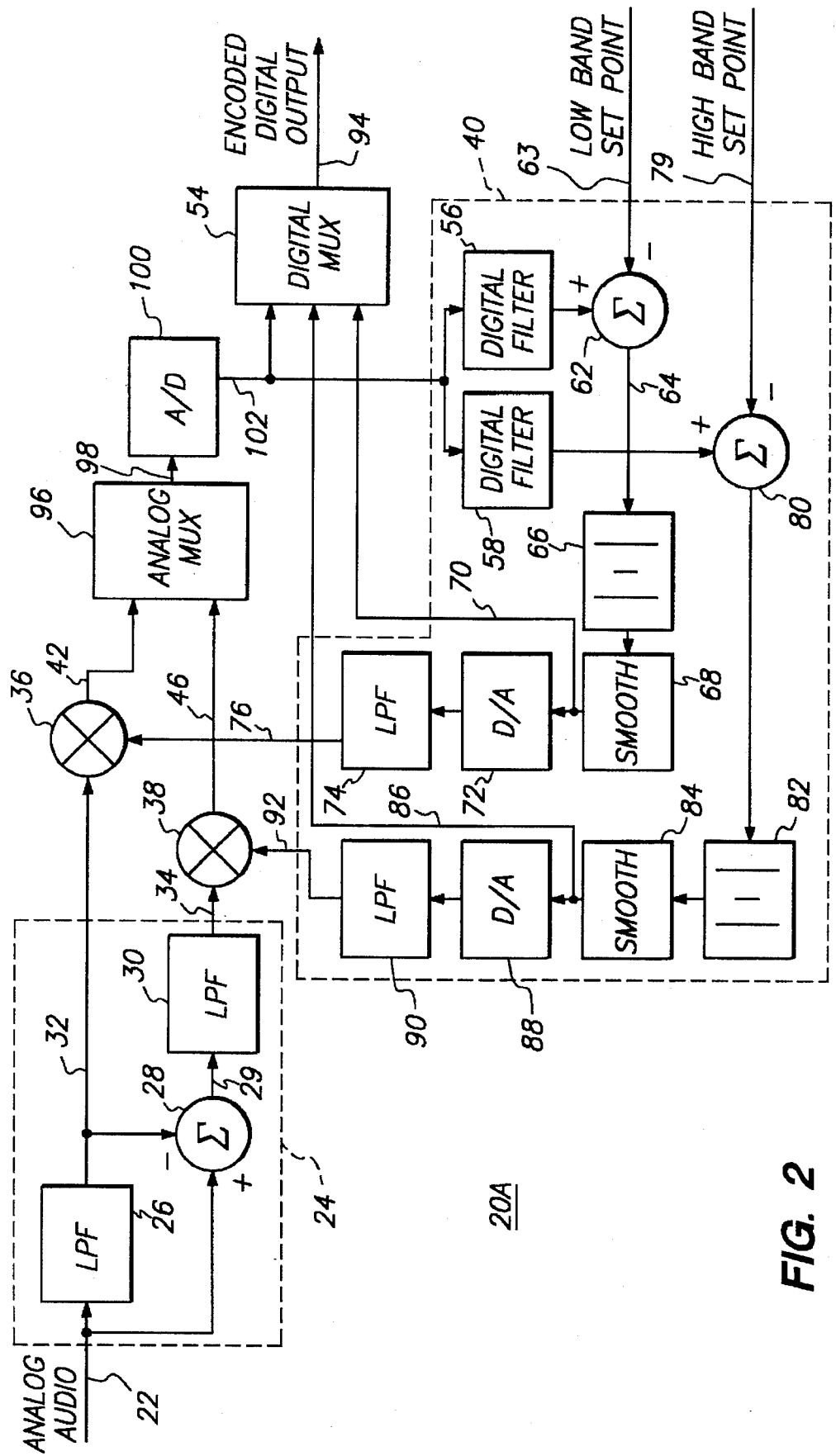
FIG. 2 is a block diagram of an audio signal conversion system according to an alternative embodiment of the invention.

Referring now to FIG. 2, an alternative embodiment of the present invention is shown. The function of ASCS 20A in FIG. 2 is identical to that of ASCS 20 of FIG. 1, with the exception of the A/D conversion performed on signals 42 and 46. In ASCS 20A, an analog multiplexer 96 is used to asymmetrically switch between signals 42 and 46, at a rate proportional to the sample rate requirements of signals 42 and 46. Analog multiplexer 96 generates a single time division multiplexed analog output stream 98 which is used as an input by A/D converter 100.

A/D converter 100 preferably generates a digitized serial data stream 102 having an 8 bit PCM output per sample. Data stream 102 is fed into digital filters 56 and 58, which operate as discussed above with respect to FIG. 1.

Digital multiplexer 54 receives as an input the digitized serial data stream 102, containing nearly the same information as digitized signals 50 and 52 of FIG. 1, the only difference being the number of bits per sample used to represent the low band signal. ASCS 20A provides the advantage of lower cost implementation than the ASCS 20 of FIG. 1, since only one A/D converter is needed. However, there is some trade-off in the quality of the reproduced signal.

In summary, a system for audio signal conversion using frequency band division has been described.

The present invention has been described in terms of a preferred embodiment. The invention, however, is not limited to the embodiment depicted and described. In particular, it will be apparent to those skilled in the art that the present invention may be used by a system in which a broadband signal is split into more than two frequency bands, or in a system where the broadband input signal has a power density characteristic that is not inversely proportional to frequency. The scope of the invention is defined by the appended claims.

What is claimed is:

1. A system for encoding an analog audio input signal comprising analog band splitter means, coupled to said analog audio input signal, for generating a first band audio signal and a second band audio signal, first gain controlled amplifier means, coupled to said first band audio signal, for generating an amplitude controlled first band signal, second gain controlled amplifier means, coupled to said second band audio signal for generating an amplitude controlled second band signal, analog multiplexer means, coupled to said amplitude controlled first band signal and said amplitude controlled second band signal, for generating an analog time division multiplexed signal, and analog to digital converter means, coupled to said analog time division multiplexed signal, for generating a digitized time division multiplexed signal, wherein said first and said second gain controlled amplifier means are transconductance cells with a linear transfer characteristic.

2. A system for encoding an analog audio input signal comprising analog band splitter means, coupled to said analog audio input signal, for generating a first band audio signal and a second band audio signal, first gain controlled amplifier means, coupled to said first band audio signal, for generating an amplitude controlled first band signal, second gain controlled amplifier means, coupled to said second band audio signal, for generating an amplitude controlled second band signal, analog multiplexer means, coupled to said amplitude controlled first band signal and said amplitude controlled second band signal, for generating an analog time division multiplexed signal, and analog to digital converter means, coupled to said analog time division multiplexed signal, for generating a digitized time division multiplexed signal, wherein said analog multiplexer means samples said amplitude controlled first band signal at a first rate, and samples said amplitude controlled second band signal at a second rate.

3. The system of claim 2 wherein said first rate is less than said second rate.

4. The system of claim 3 wherein said first rate is 2 kHz and said second rate is 44.1 kHz.

5. An audio signal conversion system comprising an analog band splitter having an input, a first output, and a second output, said input of said analog band splitter coupled to an analog audio input signal, said first output of said analog band splitter generating a first band audio signal, said second output of said analog band splitter generating a second band audio signal, a first gain controlled amplifier having an input and an output, said input of said first gain controlled amplifier coupled to said first band audio signal, said output of said first gain controlled amplifier generating an amplitude controlled first band signal, a second gain controlled amplifier having an input and an output, said input of said second gain controlled amplifier coupled to said second band audio signal, said output of said second gain controlled amplifier generating an amplitude controlled second band signal, an analog multiplexer having a first input, a second input, and an output, said first input of said analog multiplexer coupled to said amplitude controlled first band signal, said second input of said analog multiplexer coupled to said amplitude controlled second band signal, said output of said analog multiplexer generating an analog time division multiplexed signal, and an analog to digital converter having an input and an output, said input of said analog to digital converter coupled to said analog time division multiplexed signal, said output of said analog to digital converter generating a digitized time division multiplexed signal, wherein said first and said second gain controlled amplifiers are transconductance cells with a linear transfer characteristic.

6. An audio signal conversion system comprising an analog band splitter having an input, a first output, and a second output, said input of said analog band splitter coupled to an analog audio input signal, said first output of said analog band splitter generating a first band audio signal, said second output of said analog band splitter generating a second band audio signal, a first gain controlled amplifier having an input and an output, said input of said first gain controlled amplifier coupled to said first band audio signal, said output of said first gain controlled amplifier generating an amplitude controlled first band signal, a second gain controlled amplifier having an input and an output, said input of said second gain controlled amplifier coupled to said second band audio signal, said output of said second gain controlled amplifier generating an amplitude controlled second band signal, an analog multiplexer having a first input, a second input, and an output, said first input of said analog multiplexer coupled to said amplitude controlled first band signal, said second input of said analog multiplexer coupled to said amplitude controlled second band signal, said output of said analog multiplexer generating an analog time division multiplexed signal, and an analog to digital converter having an input and an output, said input of said analog to digital converter coupled to said analog time division multiplexed signal, said output of said analog to digital converter generating a digitized time division multiplexed signal, wherein said first and said second gain controlled amplifiers include a control input, and further including an automatic gain control (AGC) circuit, said AGC circuit including a first input, a second input, a first digital output, a second digital output, a first analog output, and a second analog output, said first input and said second input of said AGC circuit coupled to said digitized time division multiplexed signal, said first digital output of said AGC circuit generating a first digital gain control signal, said second digital output of said AGC circuit generating a second digital gain control signal, said first analog output of said AGC circuit generating a first analog gain control signal, and said second analog output of said AGC circuit generating a second analog gain control signal.

7. The system of claim 6 wherein said control input of said first gain controlled amplifier is coupled to said first analog gain control signal, and said control input of said second gain controlled amplifier is coupled to said second analog gain control signal.

8. The system of claim 7 further including a digital multiplexer having a first input, a second input, a third input, and an output;

said first input of said digital multiplexer coupled to said digitized time division multiplexed signal;

said second input of said digital multiplexer coupled to said first digital gain control signal;

said third input of said digital multiplexer coupled to said second digital gain control signal; and said output of said digital multiplexer generating a second digital time division multiplexed signal capable of being reproduced as said analog audio input signal.

9. An audio signal conversion system comprising an analog band splitter having an input, a first output, and a second output, said input of said analog band splitter coupled to an analog audio input signal, said first output of said analog band splitter generating a first band audio signal, said second output of said analog band splitter generating a second band audio signal, a first gain controlled amplifier having an input and an output, said input of said first gain controlled amplifier coupled to said first band audio signal, said output of said first gain controlled amplifier generating an amplitude controlled first band signal, a second gain controlled amplifier having an input and an output, said input of said second gain controlled amplifier coupled to said second band audio signal, said output of said second gain controlled amplifier generating an amplitude controlled second band signal, an analog multiplexer having a first input, a second input, and an output, said first input of said analog multiplexer coupled to said amplitude controlled first band signal, said second input of said analog multiplexer coupled to said amplitude controlled second band signal, said output of said analog multiplexer generating an analog time division multiplexed signal, and an analog to digital converter having an input and an output, said input of said analog to digital converter coupled to said analog time division multiplexed signal, said output of said analog to digital converter generating a digitized time division multiplexed signal, wherein said analog multiplexer samples said amplitude controlled first band signal at a first rate, and samples said amplitude controlled second band signal at a second rate.

10. The system of claim 9 wherein said first rate is less than said second rate.

11. The system of claim 10 wherein said first rate is 2 kHz and said second rate is 44.1 kHz.

12. A system for encoding an analog audio input signal comprising analog band splitter means, coupled to said analog audio input signal, for generating a first band audio signal and a second band audio signal, first gain controlled amplifier means, coupled to said first band audio signal, for generating an amplitude controlled first band signal, second gain controlled amplifier means, coupled to said second band audio signal, for generating an amplitude controlled second band signal, first analog to digital converter means, coupled to said amplitude controlled first band signal, for generating a digitized amplitude controlled first band signal, second analog to digital converter means, coupled to said amplitude controlled second band signal for generating a digitized amplitude controlled second band signal, and digital multiplexer means, coupled to said digitized amplitude controlled first band signal and said digitized amplitude controlled second band signal, for generating a digital time division multiplexed output signal, wherein said first and said second gain controlled amplifier means are transconductance cells with a linear transfer characteristic.

13. A system for encoding an analog audio input signal comprising analog band splitter means, coupled to said analog audio input signal, for generating a first band audio signal and a second band audio signal, first gain controlled amplifier means, coupled to said first band audio signal, for generating an amplitude controlled first band signal, second gain controlled amplifier means, coupled to said second band audio signal, for generating an amplitude controlled second band signal, first analog to digital converter means, coupled to said amplitude controlled first band signal, for generating a digitized amplitude controlled first band signal, second analog to digital converter means, coupled to said amplitude controlled second band signal for generating a digitized amplitude controlled second band signal, and digital multiplexer means, coupled to said digitized amplitude controlled first band signal and said digitized amplitude controlled second band signal, for generating a digital time division multiplexed output signal, wherein said first analog to digital converter means samples said amplitude controlled first band signal at a first rate, and said second analog to digital converter means samples said amplitude controlled second band signal at a second rate.

14. The system of claim 13 wherein said first rate is less than said second rate.

15. The system of claim 14 wherein said first rate is 2 kHz and said second rate is 44.1 kHz.

16. A system for encoding an analog audio input signal comprising analog band splitter means, coupled to said analog audio input signal, for generating a first band audio signal and a second band audio signal, first gain controlled amplifier means, coupled to said first band audio signal, for generating an amplitude controlled first band signal, second gain controlled amplifier means, coupled to said second band audio signal, for generating an amplitude controlled second band signal, first analog to digital converter means, coupled to said amplitude controlled first band signal, for generating a digitized amplitude controlled first band signal, second analog to digital converter means, coupled to said amplitude controlled second band signal for generating a digitized amplitude controlled second band signal, digital multiplexer means, coupled to said digitized amplitude controlled first band signal and said digitized amplitude controlled second band signal, for generating a digital time division multiplexed output signal, wherein said first and said second gain controlled amplifiers include a control input, and further including an automatic gain control (AGC) circuit, said AGC circuit including a first input, a second input, a first digital output, a second digital output, a first analog output, and a second analog output, said first input of said AGC circuit coupled to said amplitude controlled first band signal, said second input of said AGC circuit coupled to said amplitude controlled second band signal, said first digital output of said AGC circuit generating a first digital gain control signal, said second digital output of said AGC circuit generating a second digital gain control signal, said first analog output of said AGC circuit generating a first analog gain control signal, and said second analog output of said AGC circuit generating a second analog gain control signal.

17. The system of claim 16 wherein said control input of said first gain controlled amplifier is coupled to said first analog gain control signal, and said control input of said second gain controlled amplifier is coupled to said second analog gain control signal.

18. The system of claim 17 wherein said digital multiplexer further includes a third input and a fourth input;

said third input of said digital multiplexer coupled to said first digital gain control signal;

said fourth input of said digital multiplexer coupled to said second digital gain control signal; and said output of said digital multiplexer generating a digital time division multiplexed signal capable of being reproduced as said analog audio input signal.

19. A system for encoding an analog audio input signal comprising analog band splitter means, coupled to said analog audio input signal, for generating a first band audio signal and a second band audio signal, first gain controlled amplifier means, coupled to said first band audio signal, for generating an amplitude controlled first band signal, second gain controlled amplifier means, coupled to said second band audio signal, for generating an amplitude controlled second band signal, first analog to digital converter means, coupled to said amplitude controlled first band signal, for generating a digitized amplitude controlled first band signal, Second analog to digital converter means, coupled to said amplitude controlled second band signal for generating a digitized amplitude controlled second band signal, digital multiplexer means, coupled to said digitized amplitude controlled first band signal and said digitized amplitude controlled second band signal, for generating a digital time division multiplexed output signal, and wherein said first analog to digital converter samples said amplitude controlled first band signal at a first rate, and said second analog to digital converter samples said amplitude controlled second band signal at a second rate.

20. The system of claim 19 wherein said first rate is less than said second rate.

21. The system of claim 20 wherein said first rate is 2 kHz and said second rate is 44.1 kHz.

22. A method for digitally encoding an analog audio input signal, comprising the steps of:

splitting said analog audio input signal into a first frequency band signal and a second frequency band signal;

amplifying said first frequency band signal by a first continuously variable signal, said first continuously variable signal inversely proportional to the instantaneous amplitude of said first frequency band signal;

amplifying said second frequency band signal by a second continuously variable signal, said second continuously variable signal inversely proportional to the instantaneous amplitude of said second frequency band signal;

generating a digitized representation of said amplified first frequency band signal and said amplified second frequency band signal; and multiplexing said digitized amplified first frequency band signal, said digitized amplified second frequency band signal, a digitized representation of said first continuously variable signal, and a digitized representation of said second continuously variable signal to generate a digital time division multiplexed signal capable of being reconstructed as said analog audio input signal.

23. The method of claim 22 wherein said first band audio signal is a low frequency band audio signal, and said second band audio signal is a high frequency band audio signal.

24. A method for encoding an analog audio input signal, comprising the steps of:

splitting said analog audio input signal into a first frequency band signal and a second frequency band signal;

amplifying said first frequency band signal by a first continuously variable signal, said first continuously variable signal inversely proportional to the instantaneous amplitude of said first frequency band signal;

amplifying said second frequency band signal by a second continuously variable signal, said second continuously variable signal inversely proportional to the instantaneous amplitude of said second frequency band signal;

time division multiplexing said amplified first frequency band signal and said amplified second frequency band signal to generate an analog time division multiplexed signal;

converting said analog time division multiplexed into a first digital time division multiplexed signal; and time division multiplexing said first digital time division multiplexed signal, a digitized representation of said first continuously variable signal, and a digitized representation of said second continuously variable signal to generate a second digital time division multiplexed signal capable of being reconstructed as said analog audio input signal.

25. The method of claim 24 wherein said first band audio signal is a low frequency band audio signal, and said second band audio signal is a high frequency band audio signal.

* * * * *